J. L. MAYER.
AGITATING OR STIRRING DEVICE FOR BOILING LIQUIDS.
APPLICATION FILED OCT. 2, 1914.
1,275,284.
Patented Aug. 13, 1918.
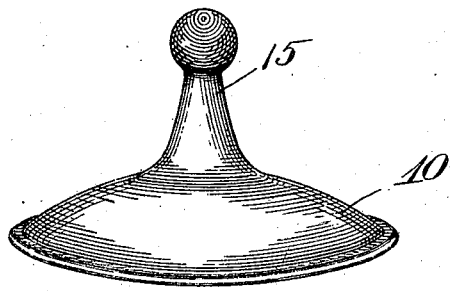
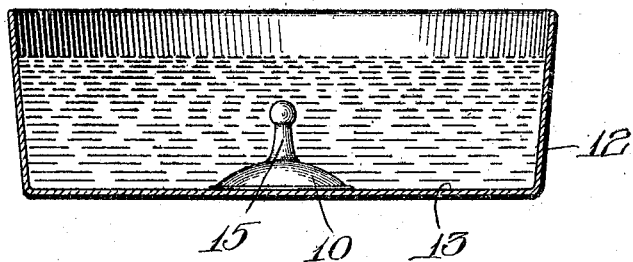
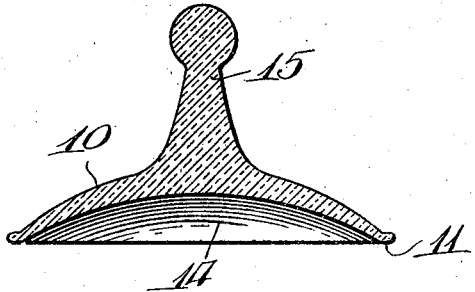
Witnesses:
Harry S. Gaither
Gertrude E. Dowle.
Inventor:
John L. Mayer
by William L. Hall
Atty

UNITED STATES PATENT OFFICE.

JOHN L. MAYER, OF CHICAGO, ILLINOIS.

AGITATING OR STIRRING DEVICE FOR BOILING LIQUIDS.

1,275,284.  Specification of Letters Patent.  Patented Aug. 13, 1918.

Application filed October 2, 1914. Serial No. 864,644.

*To all whom it may concern:*

Be it known that I, JOHN L. MAYER, a citizen of the United States, and a resident of Chicago, in the county of Cook and State of Illinois, have invented certain new and useful Improvements in Agitating or Stirring Devices for Boiling Liquids; and I do hereby declare that the following is a full, clear, and exact description thereof, reference being had to the accompanying drawings, and to the characters of reference marked thereon, which form a part of this specification.

This invention relates to a novel agitating or stirring device for automatically stirring relatively light liquids, such for instance, as milk, compounds containing milk, jellies and the like, when boiling the same to prevent the liquid sticking to the bottom of the receptacle and being thereby burned, and thereby avoid the necessity of manually stirring the boiling liquid and the inconvenience of standing over the heat during the boiling period.

In the drawings:—

Figure 1 is a perspective view of a stirring or agitating device embodying my invention.

Fig. 2 shows the position thereof in a cooking receptacle, the receptacle being shown in section.

Fig. 3 is a vertical section of the device.

A device embodying my invention comprises a base or body 10 that is provided at its periphery with a downwardly facing seat 11 which rests upon the bottom 13 of the receptacle 12 in which the liquid is being boiled, the lower side of the said body or base, surrounded by the seat 12, being concave so as to provide therebelow a chamber 14 to contain a portion of the liquid being boiled. Preferably the device is provided with an upstanding hand piece 15 of any suitable form so that it may be easily handled. The base or body 10, as herein shown, is of circular contour, but the peripheral configuration of the base may be varied while retaining the properties necessary for the device to function. Preferably, the seat 11 which engages the receptacle bottom is of some width as distinguished from a line contact between the device and receptacle bottom, so as to thereby provide a comparatively fluid tight joint between the contacting surfaces. It will be noted from an inspection of Fig. 2 that the agitator is of a diameter to cover but a very small fractional part of the bottom of the cooking vessel, the relative areas of the said agitator and vessel herein shown being in the neighborhood of one to twelve.

In the use of the device it is placed upon the bottom of the receptacle 12 in the manner shown in Fig. 2. When the liquid reaches the boiling temperature, the agitation of the liquid in the chamber 14 at the base of the device and the variations of air pressure within said chamber cause the device to tip sidewise so as to permit an interchange of pressures between the chamber 14 and the space within the receptacle exterior to the device through the space between the raised portion or seat 11 and the bottom of the receptacle. When the device is so tipped the interchange of pressures through the space beneath the raised edge of the seat acts with a reactive effect to cause the device to be shifted laterally over the bottom of the receptacle, so that the part of the seat 11 then in contact with the receptacle bottom scrapes over the said bottom in a manner to dislodge any portion of the liquid compound which tends to stick to said bottom. Thereby the liquid is prevented from burning. This lateral shifting of the device over the bottom of the receptacle is irregular with respect to direction but it has been demonstrated that the movement of the device under the conditions described is sufficiently rapid and extensive as to touch all parts of the bottom of the receptacle with such frequency as to prevent the liquid adhering to the bottom and to thereby prevent the burning thereof. Such lateral movement of the device over the bottom of the receptacle may be affected to some extent by the ebullition of the liquid in the receptacle exterior to the device, but is principally due to the action of the boiling liquid within the chamber 14 and the variations of the pressure within said chamber as compared to the pressure exterior thereto.

The device may be made of any suitable material which is sufficiently heavy to prevent it floating in the liquid. Glass, porcelain and the like are suitable materials and, by reason of the sanitary properties thereof, are recommended.

I claim as my invention:—

As an article of manufacture, a stirring device, comprising a circular shaped base of concavo-convex formation to provide a chamber within the bottom face thereof, and a central stem forming a handle rising from the convex side of the base, said base having a marginal edge forming a flat contacting rim surface concentrically of the chamber adapted when the base is at rest upon the bottom of a receptacle to form a closure therewith for the chamber and also to serve as a scraper when the base is in motion.

In testimony that I claim the foregoing as my invention I affix my signature in the presence of two witnesses, this 25th day of September, A. D. 1914.

JOHN L. MAYER.

Witnesses:
W. L. HALL.
RUTH E. ZETTERVALL.

Copies of this patent may be obtained for five cents each, by addressing the "Commissioner of Patents, Washington, D. C."